US008166397B2

(12) United States Patent
Quandt et al.

(10) Patent No.: US 8,166,397 B2
(45) Date of Patent: Apr. 24, 2012

(54) AUDIO PROCESSING INTERFACE

(75) Inventors: Thorsten K. S. Quandt, Hamburg (DE); Jan-Hinnerk Helms, Hamburg (DE)

(73) Assignee: Apple Inc., Cupertino, CA (US)

( * ) Notice: Subject to any disclaimer, the term of this patent is extended or adjusted under 35 U.S.C. 154(b) by 533 days.

(21) Appl. No.: 12/347,367

(22) Filed: Dec. 31, 2008

(65) Prior Publication Data

US 2010/0169775 A1 Jul. 1, 2010

(51) Int. Cl.
*G06F 3/00* (2006.01)
*G06F 3/048* (2006.01)
*G06F 17/00* (2006.01)

(52) U.S. Cl. ........................... 715/716; 715/771; 700/94

(58) Field of Classification Search .................. 715/716, 715/771; 700/94
See application file for complete search history.

(56) References Cited

U.S. PATENT DOCUMENTS 6,160,213 A * 12/2000 Arnold et al. .................. 84/615
2009/0013262 A1* 1/2009 Hamaguchi et al. .......... 715/751

OTHER PUBLICATIONS

Dan, "AmpliTube 2 and AmpegSVX from IK Multimedia," Aug. 31, 2007, GuitarGearHeads—Gear Up Your Sound, retrieved from http://www.guitargearheads.com/modules/news/article.php?storyid=247, pp. 1-10.*
"IK Multimedia Amplitube 2—The Amplitube Strikes Back!," Aug. 25, 2006, Futuremusic Presents ::: TestDrive Product Reviews, retrieved from http://www.futuremusic.com/news/testdrive/amplitube2.html, pp. 1-3.*
Paul White, "IK Multimedia Amplitube 2—Amp Simulation Plug-in," Jul. 2006, Sound on Sound, retrieved from http://www.soundonsound.com/sos/jul06/articles/ikamplitube2.htm, pp. 1-4.*
Markus, "Software review of AmpliTube 2 (Advanced Guitar Amp and FX Modeling Plug-in," Apr. 25, 2006, RockReviews, retrieved from http://www.rockreviews.org/softreviews/ikmultimediaamplitube2.php, pp. 1-4.*
Ken Volpe, "Gear Review: AmpliTube 2," May 10, 2007, Guitar Jam Daily, retrieved from http://gjd.guitaraffair.com/reviews/24-reviews/254-gear-review-amplitube-2, p. 1.*
"Overloud TH1 1.0 Released!," Sep. 19, 2008-Mar. 13, 2009, Guitar Amp Modeling, retrieved from http://www.guitarampmodeling.com/viewtopic.php?f=51&t=3847, pp. 1-119.*
Paul White, "Overloud TH1—Software Guitar Amp Simulator [Mac-PC]," Mar. 2009, Sound on Sound, retrieved from http://www.soundonsound.com/sos/mar09/articles/th1.htm, pp. 1-2.*
Computer Music, "Overloud TH1—Guitar amp/effects software that's up there with the best," Feb. 11, 2009, MusicRadar.com, retrieved from http://www.musicradar.com/gear/all/computers-software/plug-in-fx/th1-195854/review, pp. 1-4.*
"TH1 Manual," Apr. 30, 2009, Overloud, Version 1.1.2, pp. 1-34.*
Sasa Gojkovic, "Guitar FX Box," http://www.guitar-fxbox.com, as published in Oct. 2007, pp. 2-5.*

(Continued)

*Primary Examiner* — Tuyetlien Tran
*Assistant Examiner* — Dino Kujundzic
(74) *Attorney, Agent, or Firm* — Blakely, Sokoloff, Taylor & Zafman LLP

(57) ABSTRACT

A graphical element resembling an instrument amplifier having audio control parameters is displayed through a graphical user interface (GUI). An additional graphical element resembling one or more instrument effects pedals is displayed. Each instrument effects pedal has separate audio control parameters. An audio input is received from an instrument. The audio input is processed according to the audio control parameters associated with the one or more instrument effects pedals and the instrument amplifier. The audio resulting from the processing is provided as an output.

15 Claims, 4 Drawing Sheets

OTHER PUBLICATIONS

"Guitar FX Box 2.6," http://www.guitaring.info, as published in Nov. 2007, pp. 2 and 4.*

"Winamp Plugins and Skins," http://www.winamp.com, pp. 5-15.*

"Playing Guitar Through Winamp," Jul. 7, 2002, Winamp Forums, retrieved from http://forums.winamp.com/showthread.php?t=93712, pp. 1-2.*

* cited by examiner

AUDIO PROCESSING INTERFACE

FIELD

Embodiments described herein relate to graphical user interfaces (GUIs) for audio processing and more particularly to GUIs associated with processing audio from musical instruments.

BACKGROUND

Musicians and other artists are increasingly using computers to generate and record new music and other artistic works. There exists a variety of software programs designed to facilitate various aspects of the music generation and/or recording processes, each with varying degrees of functionality.

Among the challenges associated with many of the aforementioned programs is the lack of intuitive user-interfaces. It can be difficult and time consuming for a musician to learn to use different music software programs. This can be a particular challenge for musicians who frequently collaborate with new and different musicians who may or may not be familiar with their particular music software. Not only can time be lost in learning how to use a music program but a musician's creativity can be hampered by the constant tinkering with software that is less than intuitive.

In addition, many software programs fail to process audio input in the same way that it would be processed and/or output during a live performance on stage (e.g., using various effects pedals and/or amplifiers on an electric guitar).

SUMMARY OF THE DESCRIPTION

A graphical element resembling an instrument amplifier (e.g., a guitar amplifier) having audio control parameters is displayed through a graphical user interface (GUI). An additional graphical element resembling one or more instrument effects pedals is displayed. Each instrument effects pedal has separate audio control parameters. An audio input is received from an instrument. The audio input is processed serially according to the audio control parameters associated with the one or more instrument effects pedals and the instrument amplifier. The audio resulting from the processing is provided as an output.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, methods, apparatuses, and systems provide improved graphical user interfaces for generating and/or recording music. The methods, apparatuses, and systems described herein can be used in conjunction with music/audio software such as, for example, Garage Band™ offered by Apple, Inc. of Cupertino, Calif.

Figure 1:
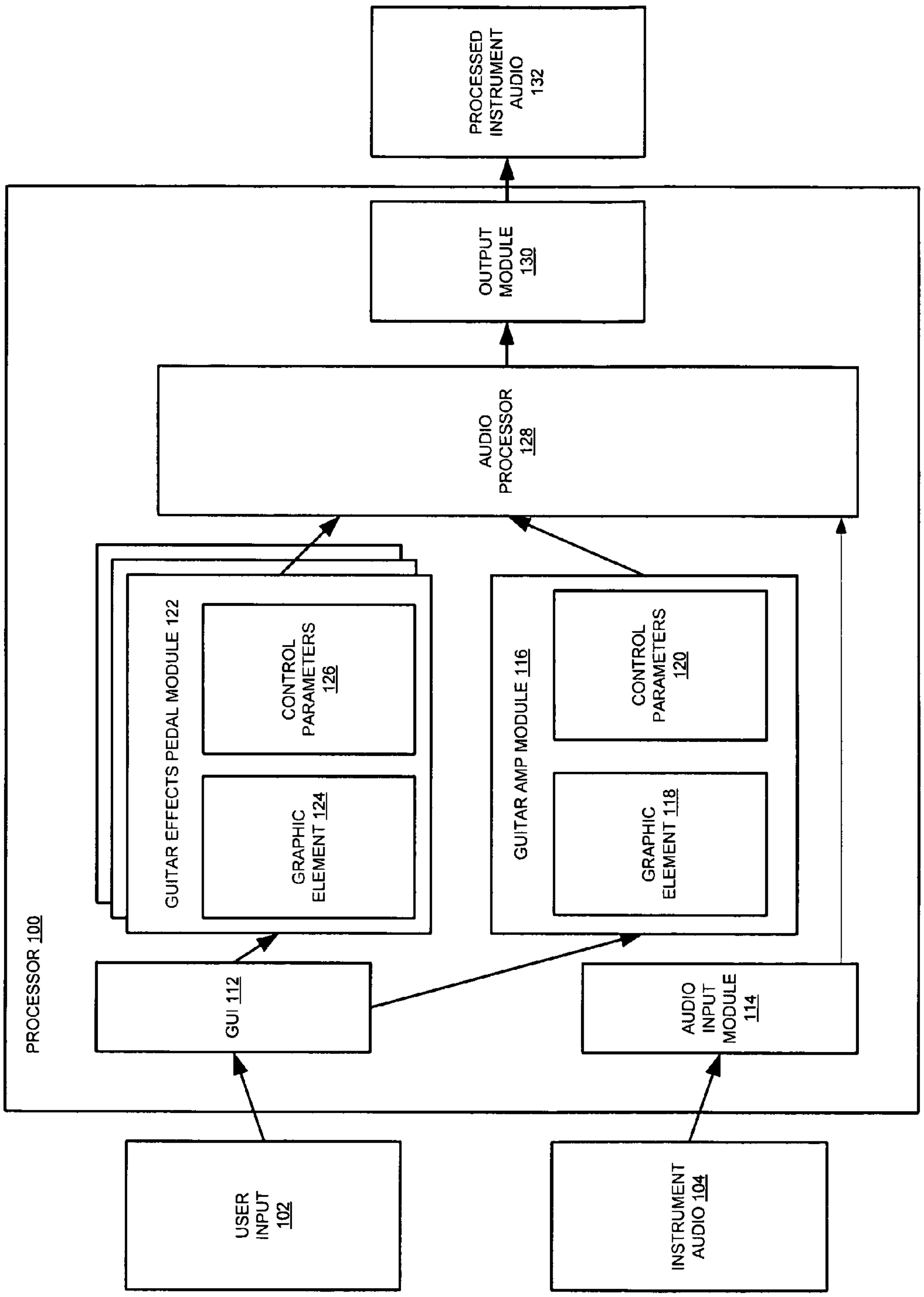
FIG. 1 is a block diagram illustrating a system according to various embodiments.

FIG. 1 is a block diagram illustrating a system according to various embodiments. Processor 110 includes various components. It should be noted that the various components can all be included within processor 110 in various embodiments, however, certain components can be separate from processor 110 in alternate embodiments. For example, processor 110 includes audio processor 128, which can be part of processor 110 or it can be its own separate processor.

Guitar effects pedal module 122 can be one module for multiple guitar effects pedals or it can be multiple modules, each for a different guitar effects pedal. And while embodiments described herein are directed towards guitars, other musical instruments that make use of effects and/or effects pedals (e.g., bass guitars, etc.) could be used according to various embodiments.

Guitar effects pedal module 122 includes graphical element 124 and control parameters 126. Graphical element 124 is displayed by GUI 112 to resemble one or more real-world guitar effects pedals (also known as "stomp boxes"). In various embodiments, graphical element 124 can be displayed with different views. For example, in response to receiving user input 102 to enter a play mode, graphical element 124 can be displayed such that it appears that one or more guitar effects pedals are sitting on a floor (e.g., a stage floor, garage floor, etc.). Other views or arrangements of the guitar effects pedal(s) could be used to visually represent the play mode selected by the user. As used herein, "play mode" refers to a mode of operation of music software that is used while playing music with an instrument that is directly and/or indirectly coupled to a computer system running the music software.

In response to receiving user input 102 to enter an edit mode, graphical element 124 can be displayed such that it appears that the one or more guitar effects pedals are lifted up off the ground (e.g., for the purpose of being adjusted, changed, etc.). Once again, other views or arrangements of the guitar effects pedal(s) could be used to visually represent the edit mode selected by the user. As used herein, "edit mode" refers to a mode of operation of the music software that is used while editing the configuration, control parameters, settings, etc. of the various modules (e.g., guitar effects pedal module 122, guitar amp module 116, etc.).

Control parameters 126 for guitar effects pedal module 122 facilitate selection of zero or more effects pedals when the system is in an edit mode. In a play mode, control parameters 126 directly influence the sound output from the guitar effects pedals. The play mode control parameters can include, but are not limited to distortion, fuzz, overdrive, chorus, reverberation, wah-wah, flanging, phaser and pitch shifting.

Guitar amplifier module 116 also includes a graphical element 118 and control parameters 120. Graphical element 118 is displayed by GUI 112 to resemble a real-world guitar amplifier. In various embodiments, graphical element 118 can be displayed with different views. For example, in response to receiving user input 102 to enter a play mode, a front view of graphical element 118 is displayed to resemble the front of a guitar amplifier. The front view can be a subelement of graphical element 118 in various embodiments. Other views or arrangements of a guitar amplifier could be used to visually represent the play mode selected by the user in other embodiments.

In response to receiving user input 102 to enter an edit mode, a back view of graphical element 118 is displayed to resemble the back of the guitar amplifier. Once again, other views or arrangements of the guitar amplifier could be used to visually represent the edit mode selected by the user in other embodiments.

Control parameters 120 for guitar amplifier module 116 facilitate control of various amp settings when the system is in an edit mode. More than one edit mode could exist in various embodiments. Amp settings may include, but are not limited to, amp model, send amounts for Master Echo and Master Reverb, input source, monitoring settings (e.g., off, on, on with feedback protection, etc.), and recording level. In a play mode, control parameters 126 directly influence the sound output from the guitar amplifier. The play mode control parameters can include, but are not limited to gain, bass, mid-range, treble, presence, master, output, reverb, tremolo rate, and tremolo depth.

System 100 also includes an audio input module 114 to receive instrument audio 104. For example, audio input module 114 might include a standard quarter inch analog plug to serve as the connection point for an analog cable connected to an electric guitar, a digital keyboard or other instrument. Other connection plugs (e.g., RCA plugs, mini RCA plugs, microphone plugs, etc.) could be used to receive instrument audio 104. It should be noted that microphones are considered instruments for purposes of the disclosure herein.

In embodiments where a system (e.g., system 100) is built directly into the instrument itself, audio input module 114 may not require connection plugs. Instead, audio input module 114 might receive audio input via a direct connection to the source of the audio.

Audio input module 114 sends audio input to audio processor 128. Audio processor 128 processes instrument audio 104 based on the control parameters (120 and 126) defined for guitar effects pedal 122 and guitar amp module 116. In various embodiments, audio processor 128 processes instrument audio 104 based on the control parameters of the guitar effects pedal module 122 before processing the audio based on the control parameters of the guitar amplifier module 116. In other words, instrument audio 104 is processed is serially in the same way that it would be processed using real effects pedals and amplifiers—the audio travels first through (and is processed by) the effects pedals and then through (and is processed by) the amplifier.

The results of the processing are output through output module 130 (e.g., a speaker, speaker system, etc.) as processed instrument audio 132.

Figure 2:
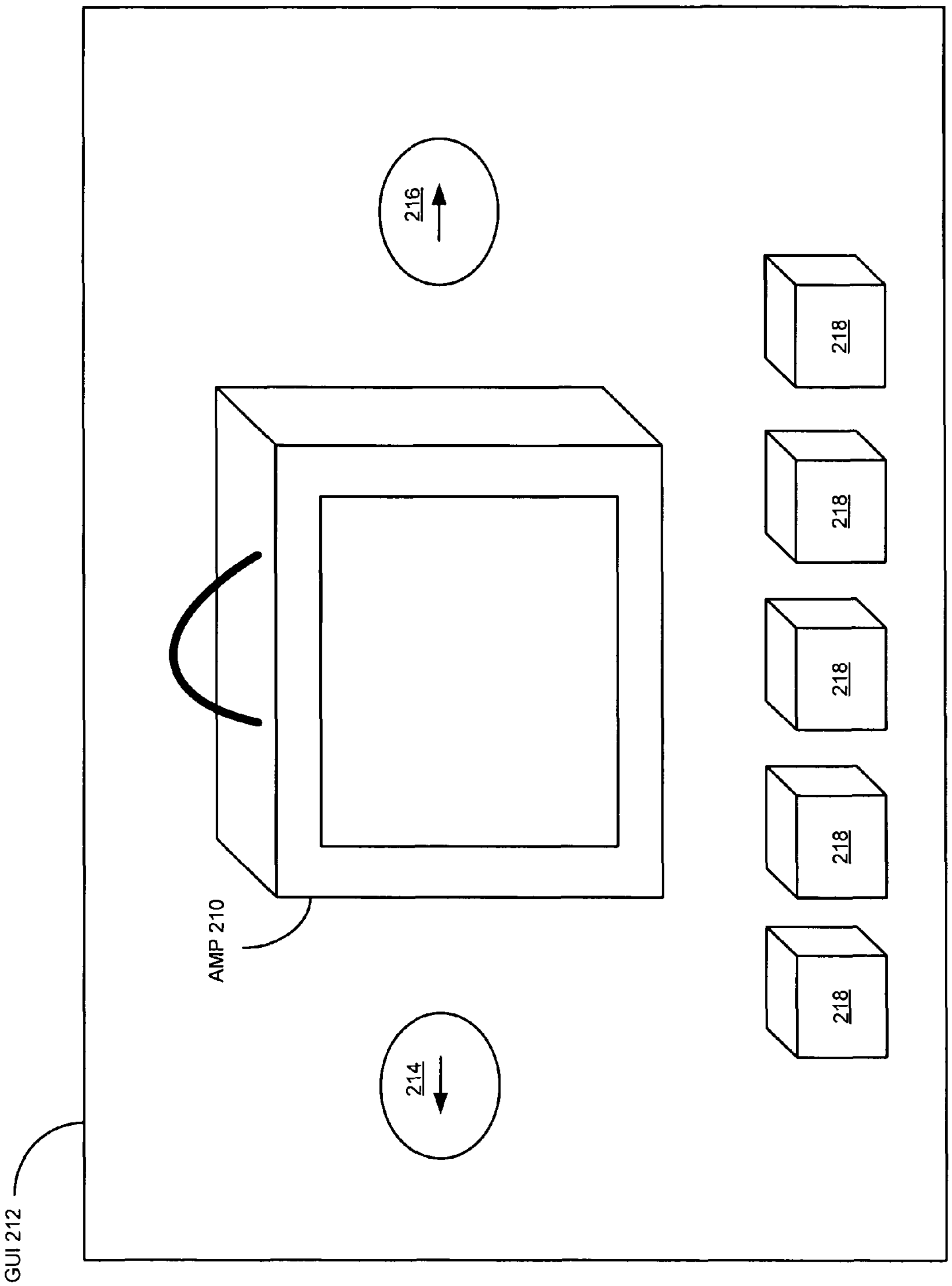
FIG. 2 is a block diagram illustrating a GUI display in a system according to various embodiments.

FIG. 2 is a block diagram illustrating a GUI display in a system according to various embodiments. GUI 212 includes a visual display of a user-selected guitar amplifier 210 and one or more guitar effects pedals 218. Clicking arrows 214 and/or 216 exchanges amplifier icons, for example, by flipping them in an animation similar to a turntable rotation.

As discussed previously, a user may enter a play mode or an edit mode in various embodiments of a music software system. When a play mode is selected, a front view of guitar amp 210 may be displayed (as shown in FIG. 2). When an edit mode is selected, a rear view of guitar amp 210 may be displayed. In some embodiments, switching between a play mode and an edit causes guitar amp icon 210 to spin around in an animation.

Effects pedals 218 are shown situated on the ground in GUI 212. Effects pedals 218 may be situated as shown when the user enters a play mode. When an edit mode is selected, effects pedals 218 may move in an animation to some other configuration/display in GUI 212, such as, for example, a configuration where one or more effects pedals 218 are lifted up off the ground.

It should be noted that in various embodiments, a user will select/enable a combination of effects pedals and an amplifier. However, it is not necessary for a user to employ a selection of multiple effects pedals and an amplifier. In some embodiments, a user may select only multiple effects pedals or zero effects pedals to go with the amplifier.

Figure 3:
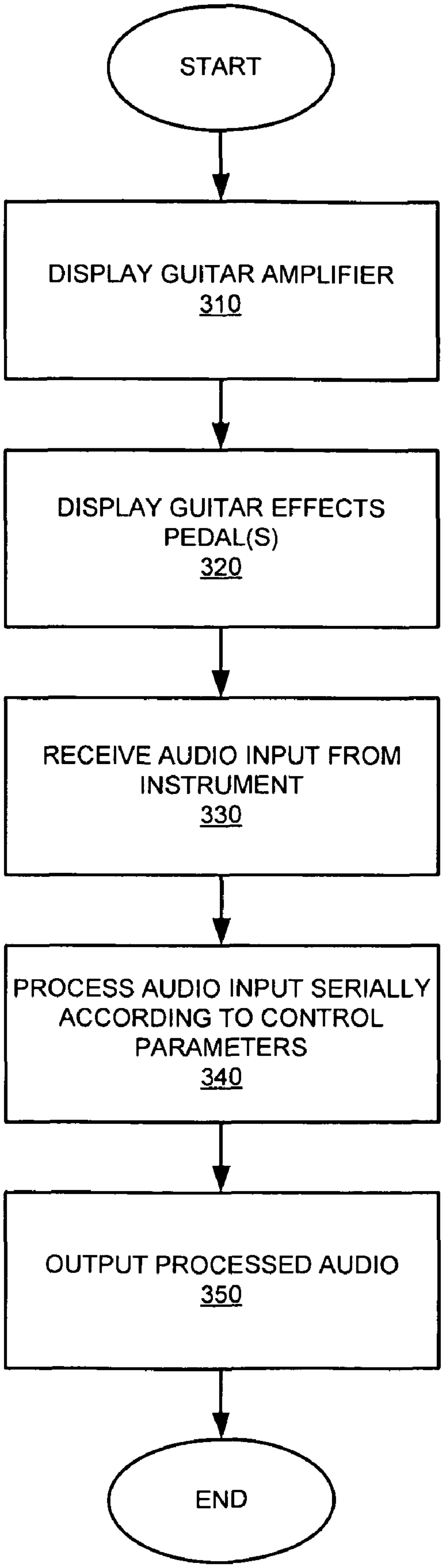
FIG. 3 is a flow diagram of operation in a system according to various embodiments.

FIG. 3 is a flow diagram of operation in a system according to various embodiments. A graphical element resembling an instrument amplifier is displayed 310 through a graphical user interface. The graphical element and/or the instrument amplifier which it represents have associated control parameters that control processing of audio input. Control parameters for the amplifier could include, but are not limited to gain, bass, mid-range, treble, presence, master, output, reverb, tremolo rate, and tremolo depth. In various embodiments, the instrument amplifier is guitar amplifier. However, the instrument amplifier could be a different amplifier/speaker setup (e.g., for a synthesizer keyboard, a microphone, etc.) in other embodiments.

A graphical element resembling one or more instrument effects pedals is also displayed 320 through the graphical user interface. The graphical element and/or the instrument effects pedal(s) which it represents similarly have control parameters that control processing of audio input. The control parameters for the effects pedals module could include, but are not limited to distortion, fuzz, overdrive, chorus, reverberation, wah-wah, flanging, phaser and pitch shifting. In various embodiments, the effects pedals are guitar effects pedals or "stomp boxes". However, the effects pedals could, in alternate embodiments, be a sustain pedal for a piano, for example. An audio input from an instrument is received 330 through the audio input module, and processed serially according to the control parameters 340 by the audio processor. The processed audio input is output 350 through the output module.

Figure 4:
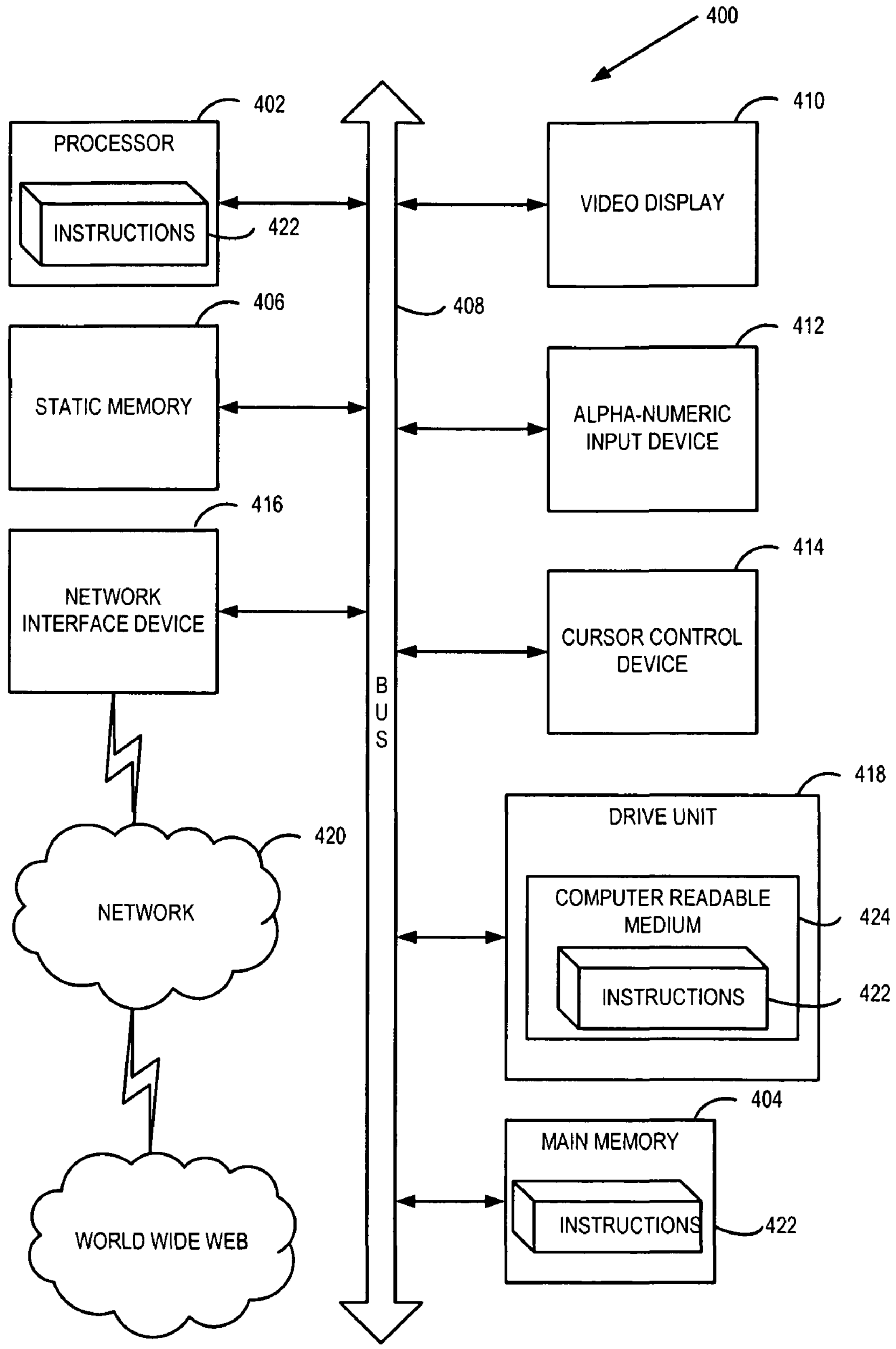
FIG. 4 is block diagram illustrating a suitable computing environment for practicing various embodiments.

FIG. 4 illustrates a diagrammatic representation of a machine in the exemplary form of a computer system 400 within which a set of instructions, for causing the machine to perform anyone or more of the methodologies discussed herein, may be executed. In alternative embodiments, the machine may be connected (e.g., networked) to other machines in a Local Area Network (LAN) 420, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 422 for performing the operations and steps discussed herein.

The computer system 400 may further include a network interface device 416. The computer system 400 also may include a video display unit 410 (e.g., a liquid crystal display (LCD) or a cathode ray tube (CRT)), an alphanumeric input device 412 (e.g., a keyboard), and a cursor control device 414 (e.g., a mouse)

The secondary memory 418 may include a machine-readable storage medium (or more specifically a computer-readable storage medium) 424 on which is stored one or more sets of instructions (e.g., software 424) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network via the network interface device 416.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer readable storage medium" shall accordingly be taken to include, but not be limited to, solid-state memories, and optical and magnetic media.

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A computer-implemented method, comprising:

presenting for display, through a graphical user interface (GUI), a graphical element resembling an instrument amplifier having audio control parameters;

presenting for display, through the GUI, a graphical element resembling one or more instrument effects pedals, each having separate audio control parameters;

receiving an audio input from an instrument;

receiving a user input to enter a mode of operation, the mode of operation selected from a group comprising of a play mode and an edit mode;

displaying a view of the instrument amplifier in response to the user input to enter the mode of operation, wherein the displaying the view of the instrument amplifier comprises displaying a front view of the instrument amplifier in response to entering the play mode and displaying a back view of the instrument amplifier in response to entering the edit mode;

displaying the one or more instrument effects pedals to resemble the one or more instrument effects pedals sitting on a floor in response to entering the play mode and being lifted up off of the floor in response to entering the edit mode; and processing the audio input according to the audio control parameters associated with the at least one instrument effects pedal and the instrument amplifier.

2. The computer-implemented method of claim 1, further comprising:

receiving the audio input from one of a software instrument or a real instrument.

3. The computer-implemented method of claim 1, further comprising:

providing an audio output resulting from the processing.

4. The computer-implemented method of claim 1, further comprising the audio control parameters for the instrument amplifier to include one or more of gain, bass, mid-range, treble, presence, master, output, reverb, tremolo rate, and tremolo depth.

5. The computer-implemented method of claim 1, wherein processing the audio input further comprises:

processing the audio input based on the control parameters for the instrument effects pedal before processing the audio input based on the control parameters for the instrument amplifier.

6. A system, comprising:

a graphical user interface (GUI);

a user input module to receive a mode of operation, the mode of operation selected from a group comprising a play mode and an edit mode;

an instrument amplifier module having audio control parameters and a graphical element resembling an instrument amplifier displayed in the GUI;

a presentation module to display the graphical element resembling the instrument amplifier in response to the system entering the mode of operation, wherein displaying the graphical element resembling the instrument amplifier comprises displaying a front view of the instrument amplifier in response to entering the play mode and displaying a back view of the instrument amplifier in response to entering the edit mode;

one or more instrument effects pedal modules, each having audio control parameters and a graphical element resembling an instrument effects pedal displayed in the GUI, wherein the presentation module displays the one or more instrument effects pedals to resemble the one or more instrument effects pedals sitting on a floor in response to entering the play mode and being lifted up off of the floor in response to entering the edit mode;

an audio input module to receive audio input from an instrument; and a processor to process the audio input according to the audio control parameters associated with the at least one instrument effects pedal module and the instrument amplifier module.

7. The system of claim 6, further comprising the audio input module to receive audio input from one of a software instrument or a real instrument.

8. The system of claim 6, further comprising:

an output module to provide an audio output resulting from the processing by the processor.

9. The system of claim 6, further comprising:

the audio control parameters for the instrument amplifier module to include one or more of gain, bass, mid-range, treble, presence, master, output, reverb, tremolo rate, and tremolo depth.

10. The system of claim 6, further comprising:

the processor to process the audio input based on the control parameters for the instrument effects pedal before processing the audio input based on the control parameters for the instrument amplifier.

11. A non-transitory computer-readable storage medium containing instructions that, when executed, cause a computer to:

present for display, through a graphical user interface (GUI), a graphical element resembling an instrument amplifier having audio control parameters;

present for display, through the GUI, a graphical element resembling one or more instrument effects pedals, each having separate audio control parameters;

receive an audio input from an instrument;

receive a user input to enter a mode of operation, the mode of operation selected from a group comprising of a play mode and an edit mode;

display a view of the instrument amplifier in response to the user input to enter the mode of operation, wherein the displaying the view of the instrument amplifier comprises displaying a front view of the instrument amplifier in response to entering the play mode and displaying a back view of the instrument amplifier in response to entering the edit mode;

display the one or more instrument effects pedals to resemble the one or more instrument effects pedals sitting on a floor in response to entering the play mode and being lifted up off of the floor in response to entering the edit mode; and process the audio input according to the audio control parameters associated with the at least one instrument effects pedal and the instrument amplifier.

12. The non-transitory computer-readable storage medium of claim 11, wherein the instructions comprise further instructions to cause the computer to:

receive the audio input from one of a software instrument or a real instrument.

13. The non-transitory computer-readable storage medium of claim 11, wherein the instructions comprise further instructions to cause the computer to:

provide an audio output resulting from the processing.

14. The non-transitory computer-readable storage medium of claim 11, wherein the instructions that cause the processing comprise further instructions to cause the computer to process the audio input according to one or more of gain, bass, mid-range, treble, presence, master, output, reverb, tremolo rate, and tremolo depth.

15. The non-transitory computer-readable storage medium of claim 11, wherein the instructions that cause the serial processing comprise further instructions to cause the computer to:

process the audio input based on the control parameters for the instrument effects pedal before processing the audio input based on the control parameters for the instrument amplifier.

* * * * *